3,475,346
INHIBITING IRON SULFIDE FROM ATTACK
BY AN AQUEOUS ACID SOLUTION
Fred Norman Teumac, Charlotte, N.C., assignor to The Dow Chemical Company, Midland, Mich., a corporation of Delaware
No Drawing. Filed Sept. 2, 1966, Ser. No. 576,823
Int. Cl. C23f 11/04
U.S. Cl. 252—401          4 Claims The invention relates to a method of inhibiting aqueous acid solutions towards iron sulfide, i.e., FeS, and to the resulting inhibited solutions.

In the concentration and leaching of ores which contain substantial amounts of iron oxides, it is often highly desirable to prevent iron from interfering with the ore recovery processes. One way to avoid interference is to form iron sulfide and to prevent dissolution of the iron sulfide on carrying out subsequent aqueous acidic leaching.

A principal object of the invention is to provide a method of inhibiting aqueous acid solutions so that they will not decompose and dissolve iron sulfide.

Another object of the invention is to provide aqueous acid solutions which are inhibited so that they will not react with iron sulfide.

A further object of the invention is to provide an inhibited aqueous acid solution suitable for use in acid leaching an ore containing iron sulfide.

These and other objects and advantages of the present invention will become apparent to those skilled in the art upon becoming familiar with the following description and the illustrative examples.

The invention is based upon the discovery that upon adding from 0.005 to 0.1 percent by weight of a nitrogen-containing polyelectrolyte, hereinafter more fully described, to a non-oxidizing aqueous acid solution, an inhibited solution is obtained which reacts very slowly with iron sulfide on being brought into contact therewith.

The nitrogen-containing polyelectrolyte used according to the invention is a polyethyleneimine or a polyethylenepolyamine and has a carbon-nitrogen intralinear chain and a carbon to nitrogen atomic ratio in the molecule of not more than about 2 to 1 and a molecular weight of at least about 140. Such compounds having higher molecular weights are to be preferred. Compounds of this type having carbon to nitrogen atomic ratios in the molecule of up to about 3 to 1 provide an inhibiting effect but to a lesser degree than those with lower ratios. These compounds must exhibit a solubility in the aqueous acid solution of at least about 0.005 percent by weight and preferably at least 0.1 percent by weight. Normally the compounds are readily soluble in aqueous solution.

The suitable polyelectrolytes include such groups of compounds as polyethyleneimine, polypropyleneimine, polybutyleneimine, alkyl mono-substituted polyethyleneimine, phenyl mono-substituted polyethyleneimine and polyalkylenepolyamines. Examples of specific compounds are triethylenetetramine, tetraethylenepentamine and pentaethylenehexamine as well as any of polyethyleneimine, poly(N-methyl)ethyleneimine, poly(N-ethyl)ethyleneimine, poly(N-phenyl)ethyleneimine, poly(N-phenylethyl)ethyleneimine, poly(C - methyl)ethyleneimine, or poly(C-ethyl)ethyleneimine having an average molecular weight in the range of about 600 to about 100,000.

Polyalkylpolyamines may be prepared, for example, by further polymerizing an alkylenepolyamine, such as ethylenediamine, diethylenetriamine, triethylenetetramine, tetraethylenepentamine or pentaethylenehexamine, by a condensation reaction with a difunctional organic compound, such as dihaloalkane, e.g., 1,2-dichloroethane and the like.

The aqueous acid solutions which are inhibited according to the invention contain proton-donating molecules capable of providing a hydrogen ion concentration of pH 3 or lower. If the concentrated acid is an oxidizing acid, the aqueous solution must be dilute enough that the inhibitor is not destroyed by oxidation in such solution during reasonable times for use of the acid solution, such as 1 to 24 hours. For example, more than about 50 percent by weight of sulfuric acid will destructively oxidize the polyelectrolyte rather rapidly at room temperatures. Preferably the concentration of either of sulfuric acid or nitric acid solutions is below about 15 percent by weight. Acids which are effectively inhibited according to the present method include aqueous hydrochloric, nitric, sulfuric, citric, oxalic and phosphoric acids.

In general somewhat greater concentrations of the polyelectrolyte are used to inhibit the more concentrated acid solutions. A concentration of polyelectrolyte in the range of 0.01 to 0.03 percent by weight is preferred. A concentration of 0.03 percent is effective in 20 percent by weight hydrochloric acid.

In making up the inhibited solution it is preferred first to dilute the acid to final concentration before adding and dissolving the polyelectrolyte.

Upon inhibiting an aqueous acid solution with a polyelectrolyte, according to the invention, for a given set of temperature and pressure conditions and acid type, the solution rate of iron sulfide appears to remain substantially constant with increased acid strength. In contrast, the solution rate of iron sulfide increases roughly in proportion with acid concentration where an inhibitor is not used. In general, pressure has little effect on effectiveness of the inhibitor. Lower temperatures in the range of about 25° to 100° C. do not adversely affect the action of the inhibitor.

The following examples are presented to illustrate the invention.

Iron sulfide, i.e., FeS, was ground to a coarse powder having an average particle diameter of about 1 millimeter. A 5 gram quantity of the iron sulfide powder was placed in each of a series of flasks. To each flask there was added, in turn, 100 milliliters of aqueous acid solution containing one of the inhibitors of the invention. As soon as the acid solution was added to each flask, the flask was attached to an apparatus that measured gas evolution by solvent displacement. The amount of gas generated was recorded periodically. The results are summarized in the following table which also shows the various acids, acid concentrations and inhibitors employed. By way of comparison, additional tests were carried out in the same manner except that no inhibitor was employed. The results of these additional tests are also summarized in the table.

| | Acid | | Inhibitor | | | |
|---|---|---|---|---|---|---|
| | Type | Concentration, percent by weight | Type | Concentration, percent by weight | Ml. of gas per hr. | Calculated FeS dissolved, grams |
| Run No.: | | | | | | |
| 1 | HCl | 3.8 | PEI [1] | 0.01 | 24 | 0.084 |
| 2 | HCl | 3.8 | PEI | 0.02 | 24 | 0.084 |
| 3 | HCl | 3.8 | PEI | 0.06 | 24 | 0.084 |
| 4 | HCl | 3.8 | PEI | 0.1 | 24 | 0.084 |
| 5 | HCl | 3.8 | PAPA [2] | 0.02 | 24 | 0.084 |
| 6 | HCl | 3.8 | Triethylene-tetramine | 0.02 | 140 | 0.69 |
| 7 | HCl | 3.8 | Pentaethylene-hexamine | 0.02 | 60 | 0.21 |
| Comparison | HCl | 3.8 | | | 360 | 1.26 |
| 8 | HCl | 6 | PEI | 0.01 | 28 | 0.091 |
| 9 | HCl | 6 | PEI | 0.02 | 24 | 0.084 |
| Comparison | HCl | 6 | | | 480 | 1.68 |
| 10 | HCl | 15 | PEI | 0.01 | 30 | 0.105 |
| 11 | HCl | 15 | PEI | 0.02 | 24 | 0.084 |
| Comparison | HCl | 15 | | | 550 | 1.925 |
| 12 | HCl | 20 | PEI | .02 | 28 | 0.098 |
| 13 | HCl | 20 | PEI | .02 | 24 | 0.084 |
| Comparison | HCl | 20 | | | 606 | 2.12 |
| 14 | HNO₃ | 3.8 | PEI | 0.02 | 32 | 0.112 |
| Comparison | HNO₃ | 3.8 | | | 280 | 0.98 |
| 15 | H₂SO₄ | 3.8 | PEI | 0.02 | 48 | 0.162 |
| Comparison | H₂SO₄ | 3.8 | | | 320 | 1.18 |
| 16 | HC₂H₃O₂ | 3.8 | PEI | 0.02 | 6 | 0.02 |
| Comparison | HC₂H₃O₂ | 3.8 | | | 120 | 0.42 |
| 17 | Citric | 3.8 | PEI | 0.02 | 8 | 0.03 |
| Comparison | Citric | 3.8 | | | 160 | 0.53 |

[1] PEI=Polyethyleneimine.
[2] PAPA=Polyalkylenepolyamine.

Tetraethylenepentamine, polypropyleneimine, polybutyleneimine, poly(N-phenylethyl)ethyleneimine. Poly(C-methyl)ethyleneimine, poly(C-ethyl)ethyleneimine, poly(N-methyl)ethyleneimine and poly(N-ethyl)ethyleneimine are each capable of providing an excellent acid inhibiting effect when tested in the same manner as described for the foregoing tests.

I claim:

1. The method of preventing attack on iron sulfide by a substantially non-oxidizing aqueous acid solution in contact therewith, which comprises:
   adding to the aqueous acid solution from about 0.005 to about 0.1 percent by weight of a nitrogen-containing polyelectrolyte having a carbon-nitrogenintralinear chain, a carbon to nitrogen atomic ratio in the molecule of about 2 to 1, a molecular weight of at least about 140 and a water solubility of at least about 0.005 percent by weight.

2. The method as in claim 1 in which the polyelectrolyte is a polyalkylenepolyamine having an average molecular weight up to about 100,000.

3. The method as in claim 1 in which the polyelectrolyte is a compound selected from the group consisting of polyethyleneimine, polypropyleneimine, polybutyleneimine, alkyl mono-substituted polyethyleneimine, phenyl mono-substituted polyethyleneimine, and phenylethyl mono-substituted polyethyleneimine, such compound having an average molecular weight in the range of about 600 to about 100,000.

4. The method as in claim 1 in which the acid is selected from the group consisting of hydrochloric, nitric, sulfuric, acetic, phosphoric, oxalic and citric acids.

References Cited

UNITED STATES PATENTS 3,262,791   7/1966   Dickson et al. _____ 252—390 X
3,262,951   7/1966   Katz _____ 252—390 X LEON D. ROSDOL, Primary Examiner I. GLUCK, Assistant Examiner U.S. Cl. X.R.

21—2.5, 58; 23—134; 75—2; 252—8.55, 148, 390